July 24, 1951    C. WILLIAMS    2,562,008
BRAKING DEVICE FOR TOWED VEHICLES
Filed June 28, 1949    2 Sheets-Sheet 1

INVENTOR.
CHESTER WILLIAMS
BY Edward M. Apple
ATTORNEY

INVENTOR.
CHESTER WILLIAMS
BY Edward M. Apple
ATTORNEY

Patented July 24, 1951

2,562,008

UNITED STATES PATENT OFFICE 2,562,008

BRAKING DEVICE FOR TOWED VEHICLES

Chester Williams, Ypsilanti, Mich.

Application June 28, 1949, Serial No. 101,705

7 Claims. (Cl. 188—112)

This invention relates to automotive vehicles and has particular reference to a braking device for an automobile being towed by another with a bumper to bumper hitch.

An object of the invention is to generally improve towing devices and to provide a bumper to bumper automobile towing device which is provided with means to automatically brake and otherwise control the towed vehicle.

Another object of the invention is to provide an improved automatic braking mechanism for a towed automobile, which is readily applicable to the well known "Red Arrow" towbar.

Another object of the invention is to provide a device of the character indicated in which the braking characteristics of the towed vehicle can be adjusted to suit driver requirements or road conditions, by a simple adjustment of the spring tension on the brake arm.

Another object of the invention is the provision of a device of the character indicated in which the braking action on the towed vehicle occurs only during the positive braking action of the towing vehicle. This is accomplished by means of proper adjustment of the spring tension on the brake arm member and by the use of a cam at the lower end of the brake arm, which cam is provided with considerable friction which prevents the movement of the brake arm by minor shock loads such as experienced when crossing a railroad track or when traveling over road imperfections.

Another object of the invention is the provision of a combined towing and automatic braking device which is constructed and arranged to obviate any tendency of the brake on the towed vehicle to stick. This result is accomplished by maintaining a proper spring load on the upper part of the brake arm of the device.

Another object of the invention is the provision of a towing and braking mechanism which is constructed and arranged to provide positive braking action on the vehicle being towed with a minimum of lash. This result is accomplished by slidably enclosing the braking cable in a loom, which loom is secured at either end against longitudinal movement.

Another object of the invention is to provide a device which causes instantaneous brake response on the towed vehicle as a result of the compressive spring loads carried on the braking members of the device.

Another object of the invention is to provide a separate brake assembly which is readily substituted for one of the elements comprising a conventional bumper to bumper towbar.

Another object of the invention is the provision of a towing and braking mechanism which overcomes any tendency of the towed vehicle to surge, there being means for adjusting the strength of the surge resistance.

Another object of the invention is the provision of a device of the character indicated which is provided with counter-acting spring tension means.

Another object of the invention is the provision of a device of the character indicated which enables the operator to back both the towed and the towing vehicle without putting on the brakes.

Another object of the invention is to provide a towing and braking mechanism which is constructed and arranged so that the braking tension may be so finely adjusted that proper braking action may be effected on the towed automobile even on icy roads.

Another object of the invention is the provision of a towing and braking mechanism which is constructed and arranged to provide a safety factor for use on steep grades. For example, the towing vehicle could be stopped and then be placed in reverse gear, this would put a sudden jerk on the towed vehicle which would overcome the spring tension on the braking mechanism and would cause the brakes on the towed car to be actuated.

The foregoing and other objects and advantages of the invention will become more apparent as the description proceeds, reference being made from time to time to the accompanying drawings forming part of the within disclosure, in which drawings.

Figure 1:
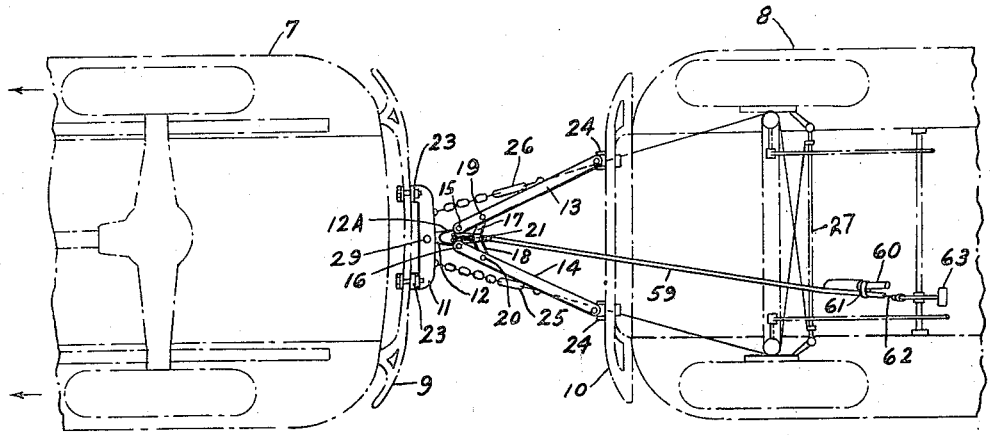
Fig. 1 is a bottom plan view of towed and towing vehicles equipped with a device embodying the invention.

Referring now more particularly to the drawings, it will be understood that in the embodiment herein disclosed the reference character 7 indicates the towing vehicle and the reference character 8 indicates the vehicle being towed. The towing vehicle 7 has a rear bumper 9 and the towed vehicle 8 has a front bumper 10, which bumpers 9 and 10 are preferably connected by means of a "Red Arrow" towbar which is more fully described in United States Letters Patent No. 2,120,422 and 2,206,991.

The "Red Arrow" towbar consists generally of a yoke or draw beam 11, a pull bar 12, and a pair of divergent arms 13 and 14, which said arms are pivoted as at 15 and 16 to a laminated sub-member 12A, comprising part of the pull bar 12. Equalizing spreader arms 17 and 18, each consisting of two straps of metal in spaced relation to each other, are pivoted to the arms 13 and 14 as at 19 and 20, and to a pivot member 21 which is slidable in a slot 22 formed in the pull bar sub-member 12A. The arms 13 and 14 are preferably made of channel iron so that the spreader arms 17 and 18 may ride in their channels when the arms 13 and 14 are brought together.

The yoke 11 is secured at either end to the rear bumper 9 of the towing vehicle 7 by means of clamps 23, and the divergent ends of the arms 13 and 14 are secured to the front bumper 10 of the towed vehicle 8 by means of clamps 24. Crossed steering members 25 and 26 are connected to the yoke 11 and to the radius rod or steering arm 27 of the towed vehicle.

The foregoing elements comprise the principal parts of the devices disclosed in United States Letters Patent Nos. 2,120,422 and 2,206,991, and function as therein described, and form no part of the within invention except as they are combined with the elements hereinafter described.

In the conventional "Red Arrow" towbar, the pull bar 12 and the sub-member 12A are rigidly fixed to one another and are not movable with respect to each other, whereas in the instant embodiment the members 12 and 12A are longitudinally slidable with respect to each other.

Figure 3:
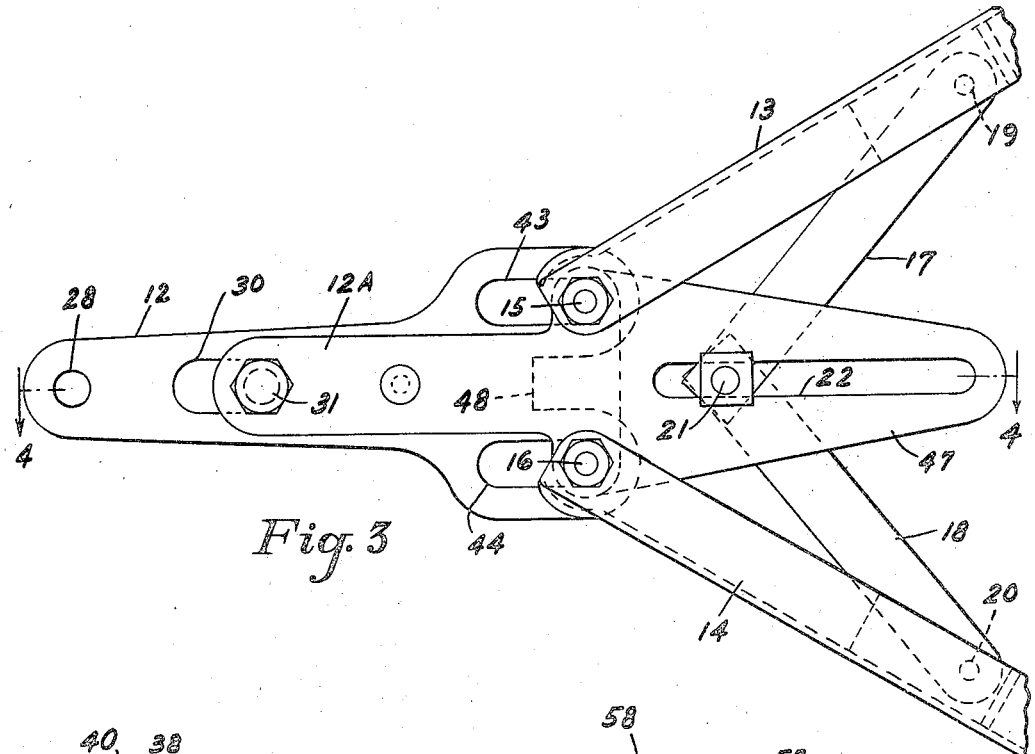
Fig. 3 is an enlarged bottom plan view of the device taken substantially on the line 3—3 of Fig. 4.
Figure 4:
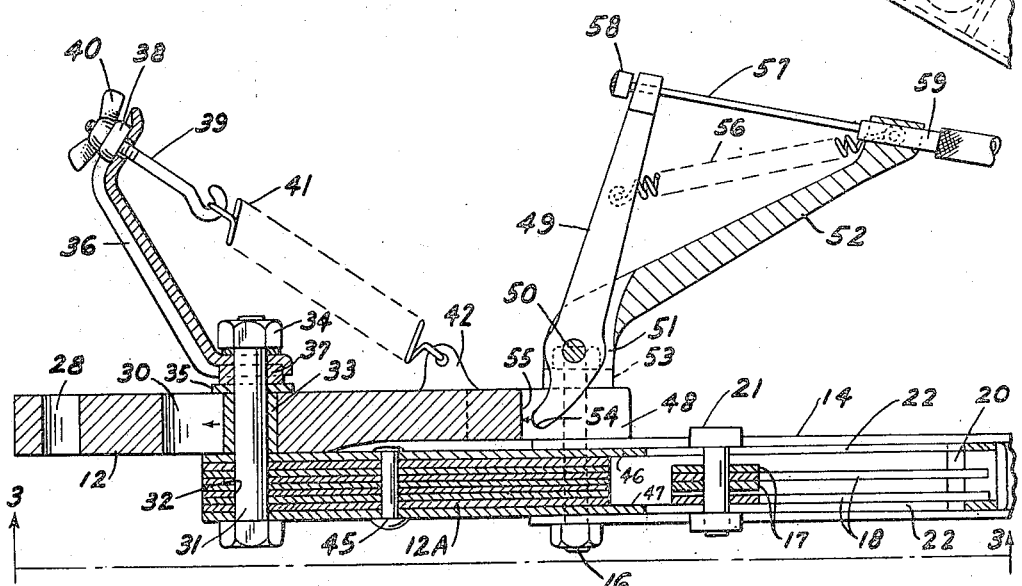
Fig. 4 is a longitudinal section taken substantially on the line 4—4 of Fig. 3.

Referring now to Figs. 3 and 4, it will be seen that the pull bar 12 is provided with a bore 28 which is adapted to accommodate a bolt or pin 29 (Fig. 1), whereby the pull bar 12 is pivotally secured to the yoke 11. A slot 30 is also formed in the bar 12 and is adapted to accommodate a bolt 31, which extends through a bore 32 formed in the sub-member 12A. A bushing 33 surrounds the bolt 31 in the slot 30 and is slightly longer than the thickness of the bar 12, so that there can be no tendency of the parts to bind when drawn down by the nut 34. An elongated washer 35 (Fig. 4), which is wider than the slot 30, rests on the bushing 33 and serves as a slidable base for the lower end of a bracket 36. A lock nut 37 is positioned between the bracket 36 and the washer 35.

The upper end of the bracket 36 is inwardly directed and is bored and is provided with an internally threaded element 38 arranged to accommodate a threaded hook member 39 at the end of which is a wing nut 40. A spring 41 is secured to the hook 39 and to a lug 42 formed on the member 12, and is arranged to have its tension adjusted by the threaded hook 39, whereby suitable resistance may be effected to the relative longitudinal movement of the members 12 and 12A.

The pull bar 12 is also slotted as at 43 and 44 to accommodate the bolts 15 and 16 which pivotally secure the ends of the arms 13 and 14 to the sub-member 12A. As previously stated, the sub-member 12A consists of a plurality of laminae or plates which are preferably riveted together as at 45. The top and bottom plates 46 and 47 are longer than the intermediate plates, and the plates 46 and 47 are formed with the slots 22 therein. It will be noted that with this form of construction, the spreader arms 17 and 18 travel between the plates 46 and 47 and are substantially concealed thereby when the arms 13 and 14 are moved toward one another.

The member 12 is provided with still another slot 48 which is substantially in alignment with the slot 30. The slot 48 is adapted to accommodate the lower end of the braking arm 49 which is pivoted as at 50 in a clevis 51 formed at the end of a bracket 52, which bracket 52 has outwardly extending ears 53 through which, respectively, the bolts 15 and 16 extend. The bolts 15 and 16 are provided with over-size-in-length bushings in the slots 43 and 44 so that there can be no binding between the member 12 and the ears 53 of the bracket 52.

The lower end of the braking arm 49 is provided with a cam surface 54 which is adapted to ride against the surface 55 comprising the end of the slot 48, so that upon the relative movement of the member 12 with respect to the member 12A, the braking arm 49 may be moved. A tension spring 56 is secured at one end to the braking arm 49 and at the other end to the bracket 52. This spring tends to urge the lower end of the braking arm 49 into contacting relation with the pull bar 12.

Figure 2:
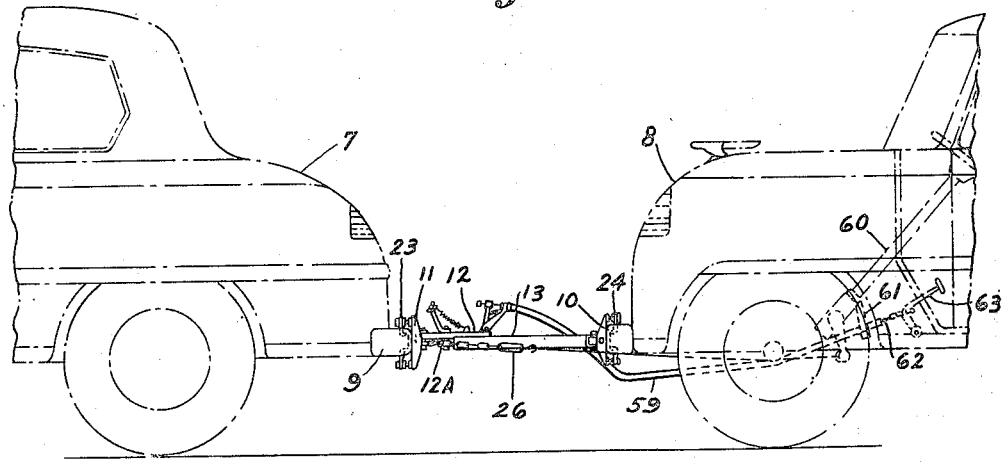
Fig. 2 is a side elevational view of the vehicles and device shown in Fig. 1.

A wire cable 57 extends through a suitable bore in the upper end of the braking arm 49 and is secured against displacement by means of an adjustable member 58. The cable 57 extends through a rubber covered wire wound loom 59 which is secured at one end to the upper end of the bracket 52 and at the opposite end, as shown in Figs. 1 and 2, to the steering post 60 of the towed vehicle by means of a strap 61 or other suitable means. The end 62 of the cable 57 is secured to the brake pedal 63 of the towed vehicle so that when the towed vehicle 8 tends to over run the towing vehicle 7, the member 12A moves longitudinally with respect to the member 12 causing the bracket 52, which carries the braking arm 49, to move correspondingly, thereby effecting braking action on the towed vehicle through the cable 57. It will be noted that the spring 41 is much larger than the spring 56 and its tension is adjustable as previously described so that by making the proper adjustment on the spring 41, a highly sensitive balance may be effected between the members 12 and 12A to effect the results previously indicated.

Having described my invention what I claim and desire to secure by Letters Patent is:

1. In a device of the character described, including a pull bar arranged for attachment to the bumper of a towing vehicle and a pair of divergent arms arranged for attachment to the bumper of a towed vehicle, the combination of a member underlying a portion of said pull bar and slidable relative thereto, said member having pivoted thereto the ends of said pair of divergent arms, a bracket carried by said underlying member, a brake arm pivoted to said bracket and having a cam member arranged to contact a portion of said pull bar, a cable extending from said brake arm to the brake lever of the towed vehicle, and spring means interposed between said pull bar and said underlying member, and spring means interposed between said brake arm and the bracket carried by said underlying member.

2. The combination defined in claim 1, in which said cable slidably engages a loom which is secured at one end to the said bracket and which is secured at the other end to a rigid element on said towed vehicle adjacent the said brake lever.

3. The combination defined in claim 1, including means for adjusting the tension on the spring means interposed between the said pull bar and said underlying member.

4. In a device of the character described including a pull bar arranged for attachment to the rear bumper of a towing vehicle and a pair of divergent arms arranged for attachment to the front bumper of a towed vehicle, the combination of a member underlying one end of said pull bar and slidable relative thereto, said member having the converging ends of said diverging arms pivoted thereto, a bracket secured to said member by means extending through slots formed near the end of said draw bar, a braking arm pivoted to said bracket and having a cam member adapted to contact said pull bar, a flexible loom secured at one end to said bracket and secured at the other end to a fixed part of the towed vehicle, a cable slidable in said loom, said cable having one end adjustably secured to said braking arm and the other end secured to the brake lever of said towed vehicle, and a tension spring interposed between said brake arm and said bracket.

5. The combination defined in claim 4, including a pin secured to one end of said underlying member and extending through a slot formed in said pull bar, a bracket supported by said pin and slidable with reference to said pull bar, and an adjustable tension spring secured at one end to said bracket and secured at the other end to a member formed on said pull bar.

6. In a device of the character described, in combination, a pair of diverging arms pivoted at their converging ends to a member comprising a plurality of metal plates, the upper and lower plates of said member having outwardly extended and slotted portions, spreader arms pivoted to said diverging arms and to a member slidable in the slots of said plate extensions, a flat pull bar having longitudinal slots adapted to accommodate pins carried by said first named member and arranged for longitudinal movement relative thereto, brackets carried by said pins, one of said brackets being arranged to pivotally support a braking arm and fixedly support one end of a flexible loom, a braking arm pivoted to said last named bracket, there being a cable secured to said braking arm and slidable in said loom, the other said bracket being adapted to adjustably support a tension spring, and a tension spring secured at one end to said last named bracket and secured at the other end to a member formed on said pull bar.

7. The combination defined in claim 6, including a tension spring secured at one end to said braking arm and secured at the other end to said first named bracket.

CHESTER WILLIAMS.

REFERENCES CITED

The following references are of record in the file of this patent:

UNITED STATES PATENTS

| Number | Name | Date |
|---|---|---|
| 2,040,728 | Bulmer | May 12, 1936 |
| 2,338,934 | Gross | Jan. 11, 1944 |

FOREIGN PATENTS

| Number | Country | Date |
|---|---|---|
| 794,282 | France | Feb. 12, 1936 |